D. LIPPY & S. LINN.

A. LINN, administrator of S. LINN, dec'd.

Fruit Drying Oven.

No. 8,398. Reissued Sept. 3, 1878.

WITNESSES:

Chas. Nida

C. Sedgwick

INVENTOR:

D. Lippy

S. Linn

BY Munn & Co

ATTORNEYS.

UNITED STATES PATENT OFFICE.

DAVID LIPPY, OF MANSFIELD, OHIO, FOR HIMSELF AND ADAM LINN, ADMINISTRATOR OF SAMUEL LINN, DECEASED.

IMPROVEMENT IN FRUIT-DRYING OVENS.

Specification forming part of Letters Patent No. 44,324, dated September 20, 1864; Reissue No. 8,398, dated September 3, 1878; application filed July 23, 1878.

*To all whom it may concern:*

Be it known that we, DAVID LIPPY and SAMUEL LINN, of Mansfield, in the county of Richland and State of Ohio, have invented a new and Improved Oven for Drying Fruit; (said SAMUEL LINN is now deceased and Adam Linn appointed administrator;) and we do hereby declare that the following is a full, clear, and exact description thereof, which will enable others skilled in the art to make and use the same, reference being had to the accompanying drawings, making a part of this specification, in which—

Figure 1:
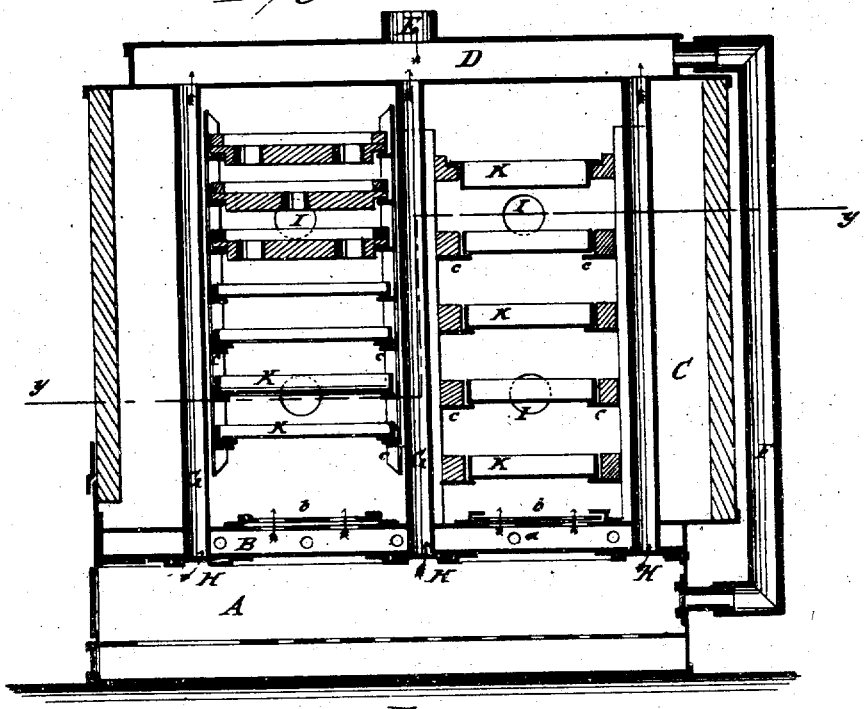
Figure 2:
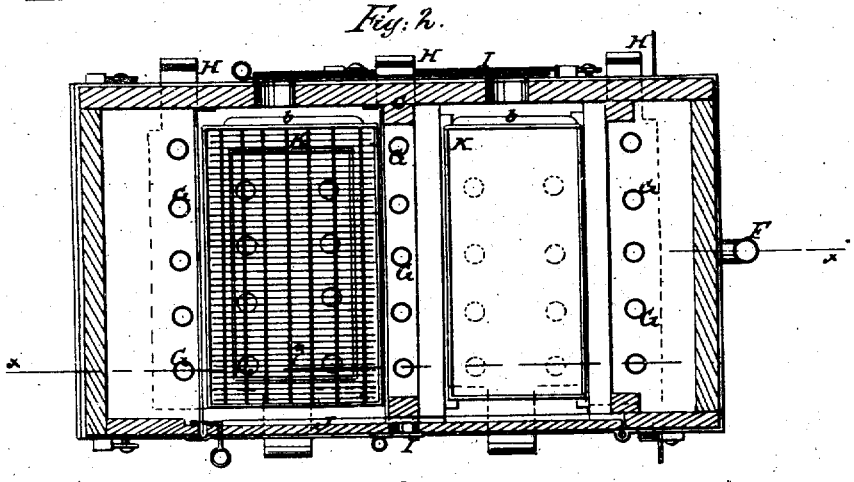
Figure 3:
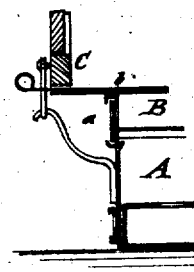

Figure 1 is a longitudinal vertical section of our invention, taken on the line *x x*, Fig. 2; Fig. 2, a horizontal section of the same, taken in the line *y y*, Fig. 1; Fig. 3, a transverse vertical section of the lower part of one side of the same, taken in the line *z z*, Fig. 2.

Similar letters of reference indicate corresponding parts.

The object of this invention is to obtain a device by which fruit may be dried with rapidity and in a thorough manner; and to this end the invention consists in providing an oven with a series of flues and registers, and arranging the same with the fire-box and a drum in such a manner that the fruit which is placed in drawers or on shelves within the oven will be exposed to the requisite degree of heat to expel moisture from them, and due provision made for the escape of the moisture.

A represents a fire-box of rectangular form and of any required dimensions, and B a chamber of the same length and breadth as the fire-box, but made shallower. The chamber B is on the top of the fire-box and has a register, *a*, at each side of it, and also has two registers, *b b*, at its top. (See Fig. 1.)

C is the oven, which is placed on the top of the chamber B, and may be of any suitable dimensions. On the top of the oven there is a drum, D, with which the smoke-pipe E communicates, and F is a pipe which communicates with the drum D and the fire-box A, as shown clearly in Fig. 1.

G represents a series of vertical flues, which are arranged in three rows, extending transversely across the flue, as shown in Fig. 2, and communicating with the fire-box A and drum D, said flues passing through the chamber B, as shown in Fig. 1. Underneath each row of flues G there is a register, H, and there are registers I at the sides of the oven C, and at one side of the oven C there is a door, J.

The oven C may be secured on the chamber B by means of any suitable fastenings.

In the oven C there are placed two or more tiers of shelves or drawers, K. These shelves or drawers are placed one over the other on cleats *c*, so that they may be drawn out of the oven and placed within it through the doors J with the greatest facility, and the shelves or drawers are provided with perforated or wire-cloth bottoms.

From the above description it will be seen that when a fire is kindled in the fire-box A the products of combustion will pass up through the flues G and pipe F into the drum D, and thence into the pipe E, the latter being the chief passage for smoke and other products of combustion, the heat chiefly passing up through the flues G.

By this arrangement the oven is heated evenly throughout, the heat passing between the shelves or drawers K and up through the fruit therein. The moisture expelled from the fruit is carried off by air, which passes into the chamber B through the side registers *a*, is admitted into the oven through the top registers *b*, and escapes therefrom through the registers I. This current of air may be regulated, as desired, by the adjustment of the registers specified, and the passage of the heat through the flues G may also be regulated as desired by adjusting the registers H.

Having thus described our invention, we claim as new and desire to secure by Letters Patent—

1. The oven C, provided with the flues G and shelves or drawers K, when used in connection with the chamber B, fire-box A, pipe F, and drum D, arranged substantially as and for the purpose herein set forth.

2. The registers *a*, *b*, H, and I, when applied respectively to the chamber B, flues G, and oven C, substantially as and for the purpose set forth.

DAVID LIPPY.
ADAM LINN,
*Administrator.*

Witnesses:
D. S. HOOVER,
GEO. W. STALLER.